UNITED STATES PATENT OFFICE.

WILHELM STERNBERG, OF BERLIN, GERMANY, ASSIGNOR TO CHEMISCHE FABRIK AUF ACTIEN, (VORM. E. SCHERING,) OF BERLIN, GERMANY.

METHYLENE CITRIC ACID AND PROCESS OF MAKING SAME.

SPECIFICATION forming part of Letters Patent No. 699,422, dated May 6, 1902.

Application filed October 29, 1901. Serial No. 80,449. (No specimens.)

*To all whom it may concern:*

Be it known that I, WILHELM STERNBERG, chemist, doctor of philosophy, a subject of the Emperor of Germany, residing at Berlin, Kingdom of Prussia, German Empire, have invented a new and useful Improvement in Methylene Citric Acid and Method of Making the Same, of which the following is a specification.

My invention relates to the manufacture of the hitherto-unknown methylene citric acid, which is of use in medicine.

To manufacture methylene citric acid one proceeds, for example, as follows: Twenty-one kilograms of citric acid are heated with four kilograms of polymeric formaldehyde (paraformaldehyde, trioxymethylene) to from 140° to 160° centigrade until the clear solution first produced begins to become cloudy and deposit crystals. The product of the reaction is then gradually allowed to cool to about 100°. It is dissolved in from twenty-five to thirty kilograms of water and filtered. The separated crystals are filtered, washed, and dried.

It is possible, but not so preferable, to allow a solution of formic aldehyde to react upon the citric acid in the presence of a condensing agent—such as, for example, hydrochloric acid or sulfuric acid.

Methylene citric acid melts at 208°. It is difficultly soluble in cold but easily in hot water. It is an aqueous solution fairly stable in the presence of acids, but less stable in the presence of carbonic acid and caustic alkalies.

Medicinally-valuable salts of methylene citric acid can be formed—such as the silver salt, the mercury salt, the magnesium salt, and the hexamethylentetramin salt. The latter is easily soluble in water, thus differing from methylene citric acid.

Methylene citric acid is useful for the disinfection of the urinary passages and for the treatment of uric acid diathesis. It is preferably administered in doses of from 0.5 to one gram three times daily.

I claim as my invention—

1. The herein-described process of manufacturing methylene citric acid, which consists in causing formaldehyde, preferably in a polymeric state, to react upon citric acid and isolating the resulting product, substantially as set forth.

2. As a new product the herein-described methylene citric acid, being a white crystalline powder, difficultly soluble in cold but easily in hot water, and melting at 208° centigrade.

In testimony whereof I have signed my name to this specification in the presence of two subscribing witnesses.

WILHELM STERNBERG.

Witnesses:
 WOLDEMAR HAUPT,
 HENRY HASPER.